United States Patent
Rumbel et al.

(10) Patent No.: US 9,057,344 B2
(45) Date of Patent: Jun. 16, 2015

(54) SYSTEM AND METHOD OF INJECTING COMBUSTIBLE GAS IN LIQUID FORM INTO A DIESEL ENGINE

(75) Inventors: Keith Murray Rumbel, Dungog (AU); Derek Robert Watkins, Dungog (AU)

(73) Assignee: Anthony James Horley, Sylvania (AU)

( * ) Notice: Subject to any disclaimer, the term of this patent is extended or adjusted under 35 U.S.C. 154(b) by 944 days.

(21) Appl. No.: 12/821,854

(22) Filed: Jun. 23, 2010

(65) Prior Publication Data

US 2011/0073072 A1 Mar. 31, 2011

(30) Foreign Application Priority Data

Jun. 23, 2009 (AU) ................................. 2009902887

(51) Int. Cl.
| | |
|---|---|
| *B60T 7/12* | (2006.01) |
| *F02M 21/02* | (2006.01) |
| *F02D 19/06* | (2006.01) |
| *F02D 19/10* | (2006.01) |
| *F02D 19/08* | (2006.01) |

(52) U.S. Cl.
CPC ....... *F02M 21/0287* (2013.01); *F02D 19/0631* (2013.01); *F02D 19/10* (2013.01); *Y02T 10/36* (2013.01); *Y02T 10/32* (2013.01); *F02D 19/061* (2013.01); *F02D 19/0689* (2013.01); *F02D 19/081* (2013.01)

(58) Field of Classification Search
USPC .................... 123/525–527, 575–578; 701/103
See application file for complete search history.

(56) References Cited

U.S. PATENT DOCUMENTS

| | | | | |
|---|---|---|---|---|
| 4,606,322 | A * | 8/1986 | Reid et al. ...................... | 123/575 |
| 5,673,673 | A * | 10/1997 | Beck .............................. | 123/527 |
| 5,887,567 | A * | 3/1999 | White et al. .................. | 123/294 |
| 5,887,574 | A * | 3/1999 | Smith ........................... | 123/527 |
| 6,067,972 | A * | 5/2000 | Jaasma ......................... | 123/549 |
| 6,237,575 | B1 * | 5/2001 | Lampert et al. ............... | 123/520 |
| 7,000,573 | B2 * | 2/2006 | Kruger ...................... | 123/27 GE |
| 7,100,577 | B2 * | 9/2006 | Mumford et al. ............. | 123/498 |
| 7,463,967 | B2 * | 12/2008 | Ancimer et al. .............. | 701/104 |
| 7,621,469 | B2 * | 11/2009 | Hornby ......................... | 239/600 |
| 8,214,128 | B2 * | 7/2012 | Watkins et al. ............... | 701/103 |
| 2005/0121005 | A1 * | 6/2005 | Edwards ....................... | 123/525 |
| 2005/0205021 | A1 * | 9/2005 | Shute ....................... | 123/27 GE |
| 2005/0284451 | A1 * | 12/2005 | Uhde et al. .................... | 123/525 |
| 2007/0157912 | A1 * | 7/2007 | Ritter et al. ................... | 123/679 |

* cited by examiner

*Primary Examiner* — Thomas Moulis
*Assistant Examiner* — Joseph Dallo
(74) *Attorney, Agent, or Firm* — Pillsbury Winthrop Shaw Pittman, LLP

(57) ABSTRACT

The present invention discloses a method of introducing fuel into a diesel engine for combustion within the engine. A combustible gas in liquid form is injected into the engine for combustion therein with diesel fuel so as to maintain a combustible gas concentration derived from the liquid in the range of 0.2%-0.6% of air intake by volume of combustible gas. Suitable gases include LPG or liquid petroleum gas, natural gas, hydrogen, ethane, methane, propane, butane, hexane, heptane, pentane, acetylene, carbon monoxide, ammonia or other combustible gas, or a combination of two or more thereof.

18 Claims, 2 Drawing Sheets

SYSTEM AND METHOD OF INJECTING COMBUSTIBLE GAS IN LIQUID FORM INTO A DIESEL ENGINE

FIELD OF THE INVENTION

The invention relates to diesel fuel engines and, in particular, to a method and system for injecting combustible gas in liquid form into a diesel fuel engine for combustion therein.

The invention has been developed primarily with respect to conventional diesel fuel engines and will be described hereinafter with reference to this application. However, it will be appreciated that the invention is not limited to this particular field of use and is also applicable to bio-diesel fuel engines, for example.

BACKGROUND ART

Diesel fuel engines have been used widely in a large array of applications such as transport, heavy machinery or power generation and form a significant component of much equipment in agriculture, mining, construction, and freight and passenger transport for many years. It is known that a combustible gas can be added to a diesel fuel engine air intake. The mixture of the combustible gas with the conventional air intake enhances combustion conditions within the cylinder so as to increase efficiency of the diesel fuel combustion process.

Typically in the prior art, a combustible gas source, for example LPG gas (liquid petroleum gas), is connected to an air inlet of a diesel fuel engine and injected by means of a solenoid valve, at some predetermined rate. This is drawn into the engine air intake stream and mixed in a venturi. The suction of the venturi is provided by the manifold vacuum or pressure difference.

Unfortunately, simple factors in engine performance deterioration significantly reduce the efficiency of the combustible gas injection and hence engine combustion. As a result, the level of the combustible gas injected is not decreased proportionally and this disadvantageously starts to decrease in any delivered efficiency gains and, depending on the deterioration of engine components such as the air filter, can cause the engine to operate inefficiently by providing conditions in which the engine efficiency is lower with a combustible gas injection than without.

Others have recognised these problems and attempted to address them. In one solution, there is provided a method and system of injecting a low concentration of combustible gas into the air intake of a diesel fuel engine. This advantageously significantly increases the combustion efficiency of diesel fuel thereby providing an increase in engine power. This also significantly reduces emissions, especially particulate matter.

With such a significant improvement in combustion efficiency, use of this system has the limitation, especially in naturally aspirated diesel engines, that the engine cannot draw in sufficient air to efficiently combust an increase in diesel fuel. This limitation is the result of engine manufacture and design which is configured to combust the diesel fuel relatively inefficiently compared with an engine operating the abovementioned method and system. In the case of turbo charged engines, it is understood that turbo boost pressure, and hence air in-take volumes, can only be increased so far without risking damage to the turbo charger. In other words, use of this system and method can cause the diesel engine to run out of or draw insufficient air to burn additional fuel so that the full benefits of the system are provided.

Genesis of the Invention

The genesis of the present invention is a desire to provide an improved method and system of injecting combustible gas into a diesel fuel engine for combustion with diesel fuel therein, or to provide a useful alternative.

SUMMARY OF THE INVENTION

According to a first aspect of the present invention there is provided a method of injecting a combustible gas in liquid form into a diesel fuel engine for combustion with diesel fuel therein, the method comprising the step of injecting the combustible gas in liquid form into the engine for combustion therein with the diesel fuel so as to maintain a combustible gas concentration in one or more cylinders of the engine prior to combustion in the amount of 0.2% to 0.6% of air intake by volume of the combustible gas.

According to another aspect of the invention there is provided a system for injecting combustible gas in liquid form into a diesel fuel engine for combustion with diesel fuel therein, the system comprising:

a combustible gas injection device having an outlet disposed in fluid communication with the engine and an inlet disposed in fluid communication with a liquid combustible gas source; and a combustible gas injection device controller configured to receive input indicative of an engine performance parameter and configured to control the rate of injection of the combustible gas in liquid form from the combustible gas injection device outlet such that the combustible gas is present in one or more cylinders of the engine prior to combustion in the amount of between 0.2% to 0.6% of air intake by volume of the combustible gas.

It can be seen there is advantageously provided a method and system of injecting combustible gas in liquid form into a diesel fuel engine that improves combustion of diesel fuel in the engine so as to decrease the emissions and increase power from the diesel engines. The method and system of injection of combustible gas in liquid form advantageously provides a pressure reduction after injection that allows more air to be mixed with fuel in the cylinder allowing the combustion of more fuel from the same engine configuration.

BRIEF DESCRIPTION OF THE DRAWINGS

Preferred embodiments of the invention will now be described, by way of example only, with reference to the accompanying drawings in which.

DETAILED DESCRIPTION

Figure 1:
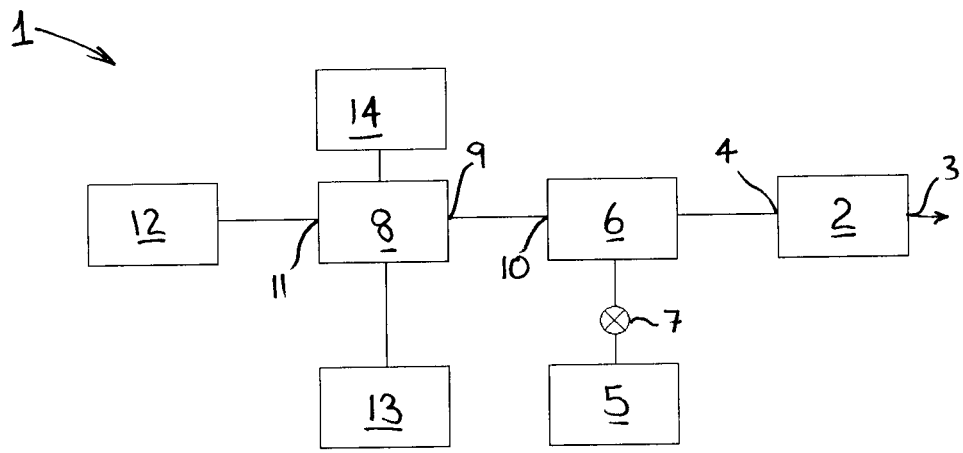
FIG. 1 is a block diagram of a system for injecting combustible gas in liquid form into a diesel fuel engine for combustion with diesel fuel therein according to a first preferred embodiment of the invention.

Referring to the drawings generally, it will be appreciated that like reference numerals have been used to denote like components. In FIG. 1, there is shown a system 1 for injecting a combustible gas in liquid form into a diesel fuel engine for combustion with diesel fuel therein. The diesel fuel engine is not illustrated. The system 1 includes a combustible gas injection device 2 having an outlet 3 disposed in fluid communication with the diesel fuel engine (not illustrated) so as to inject the combustible gas for combustion in the engine. The injection device 2 includes an inlet 4 in fluid communication with a liquid combustible gas source 5 with a combustible gas flow controller 6 disposed intermediate. An isolation valve 7 is disposed intermediate the liquid combustible gas source 5 and the flow controller 6.

A combustible gas injection device controller 8 includes an output 9 in communication with a signal input 10 of the flow controller 6. The signal received by the input 10 of the flow controller 6 controls the flow of liquid combustible gas from the source 5 through the injection device 2 and the outlet 4 into the engine. The controller 8 includes an input 11 in communication with a sensor 12 configured to provide an input to the controller 8 indicative of an engine performance parameter. The controller 8 is configured to receive the data indicative of the engine performance parameter from the sensor 12 and control the rate of injection of the liquid combustible gas through the injection device 2 via the flow controller 6. The controller 8 is configured to operate the flow controller 6 to allow the predetermined flow of liquid combustible gas in liquid form from the injection device outlet 3 such that the combustible gas is present in one or more cylinders of the engine (not illustrated) prior to combustion in the amount of 0.2% to 0.6% of the air intake by volume of the combustible gas. Most preferably, the combustible gas concentration in one or more of the engine cylinders prior to combustion is about 0.35%.

A transceiver device 13, or communications interface, is disposed in communication with the controller 8 to allow communication between the controller 8 and a remote device. The combustible gas injected in liquid form into the engine is most preferably LPG (liquid petroleum gas) or natural gas. However, it will be appreciated that the combustible gas can be any preferred combustible gas including but not limited to hydrogen, ethane, methane, propane, butane, hexane, heptane, pentane, acetylene, carbon monoxide, ammonia or a combination of one or more thereof.

The input received by the controller 8 from the sensor 12 can be indicative of any preferred engine performance parameter such as a measured percentage of combustible gas mixed in with the air intake stream prior to combustion or injection into the engine cylinders, engine revolutions per minute (RPM) from a voltage output of the alternator of the diesel fuel engine or other engine electrical source, the engine manifold absolute pressure, turbo charge of pressure in turbo charged engines, throttle position, exhaust temperature, exhaust nitrous oxide gas concentration, or an engine dynameter.

It will be appreciated that in use the system 1 injects a combustible gas into the diesel engine for combustion with the diesel fuel therein from the injection device outlet 3 such that the combustible gas is injected in liquid form. This advantageously provides a surprisingly significant pressure reduction in the environment surrounding the liquid gas injection as the liquid vaporises and hence reduces the temperature upon injection. The liquid combustible gas mixes with air from the diesel engine air intake stream (not illustrated) so as to provide a combustible gas concentration of between 0.2% to 0.6%. So far as injection of the liquid combustible gas reduces the pressure upon injection, additional air can be fed into the engine for relatively efficient combustion with diesel fuel therein.

Figure 2:
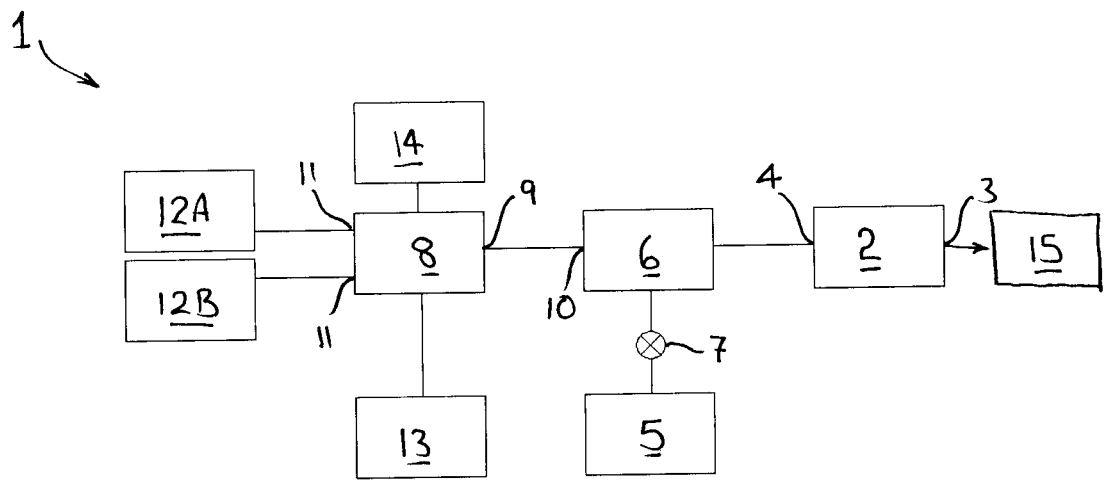
FIG. 2 is a is a block diagram of a system for injecting combustible gas in liquid form into the cylinders of a diesel fuel engine for combustion with diesel fuel therein according to a second preferred embodiment of the invention.

Referring now to FIG. 2, there is shown a schematic block diagram of a system 1 for injecting combustible gas in liquid form to the engine manifold or air intake steam (not illustrated) of a diesel fuel engine (not illustrated) for combustion with diesel fuel therein according to the second preferred embodiment. In this embodiment, the outlet 3 of the injection device 2 is in fluid communication with the air intake stream or manifold of the engine (not illustrated). The sensor 12 in the embodiment of FIG. 1 is replaced with a pair of sensors 12a and 12b. Sensor 12a measures the engine speed or RPM via an engine alternator sensor (not illustrated). Sensor 12b is a manifold absolute pressure sensor. The sensor 12b is sometimes referred to as an MAP/TP sensor and variations in values of the manifold pressure represent variations in engine load. It will be appreciated that the input from the RPM sensor 12a and MAP/TP sensor 12b each travel at a range from a zero value representing minimum engine RPM or idle and zero load to a maximum value representing maximum engine RPM and maximum load.

A cut out switch 14 is in communication with the controller 8 such that when power to the engine is removed or the throttle is moved to an idle position, the controller 8 automatically shuts off flow through the flow controller 6 as diesel fuel is not being combusted. In this embodiment the combustible gas is injected in to the engine air intake manifold and mixed therein and subsequently injected into each cylinder of the engine in turn. The concentration of the combustible gas in the air intake stream once it has entered the cylinder prior to combustion with diesel fuel therein is preferably 0.35% but can be anywhere in the range of about 0.2% to 0.6% by volume of combustible gas.

As shown in FIG. 2, the system 1 operates by receiving inputs 12a and 12b indicative of the engine RPM and manifold pressure respectively. The combustible gas is injected in liquid form into the air stream into the engine air intake upstream of an engine cylinder inlet valve to allow the air and combustible gas injected to mix. Measuring the percentage of combustible gas mixed into the air stream of the engine intake can include bleeding a portion of the mixed combustible gas air intake stream and sampling this directly with a combustible gas sensor. In other embodiments, the combustible gas/air intake mixture can be measured by combusting the bled stream and measuring the products with a time delayed hot wire sensor. Of course, any preferred direct or secondary combustible gas concentration sensor can be used as desired.

The combustible gas cut out switch 14 can be provided to turn off the combustible gas injection when the accelerator/throttle is moved to a rest or home position. Of course, the system 1 is disabled when the engine ignition system is turned off or disengaged. It will be appreciated that the preferred embodiments provides a system 1 that can be "auto-tuned" by the measurement of a single engine RPM value so as to maintain the combustible gas concentration in the air intake stream in the cylinder prior to combustion of about 0.35%, as noted below.

It is known that for an engine size of a predetermined literage value volume that the greater the RPM measured the more cycles per second the engine is operating at and more air it is consuming therefore the amount of gas required to maintain an air gas percentage of about 0.35% will increase accordingly. The following characterising equation is used to govern the injection rate of the combustible gas in liquid form into the engine 1:

Engine capacity (liters)×RPM×manifold air pressure (psi)×percentage of air intake being combustible gas=combustible gas injection rate (liters per minute).

As noted, the RPM value of the engine is determined by measuring the alternator tap. The air pressure is provided by the MAP/TP sensor and normal air pressure is approximately 14.7 psi. It is known that the percentage of combustible gas in the air intake in the cylinder prior to combustion is most preferably about 0.35%.

Following from this for a known engine volume, the RPM and manifold pressure values can be measured and it can be determined how many liters of air the engine will use every minute. This value is then multiplied by the preferred combustible gas concentration of 0.35% which provides the required combustible gas injection rate per minute. The only parameter to then know is the engine capacity and the engine RPM and manifold air pressure can be measured at idle (or any other preferred value) from which to calibrate the system 1.

Although not illustrated, the above formula for determining the combustible gas injection rates is most preferably modified to include a term on the left hand side of the equation proportional to a measured temperature of the air intake steam to allow for thermal expansion of the liquid gas and air intake stream. Likewise, it will be appreciated that any other preferred sensor inputs can be provided upon which the combustible gas injection rate is dependent. These include an oxygen sensor and/or thermistor as desired.

Furthermore, it will be appreciated that the system 1 can determine the combustible gas injection rates based on the above equation or some other equation as preferred or a lookup or data table, or indeed any other preferred means as desired. Likewise, the manifold absolute pressure sensor can be replaced by an exhaust temperature sensor, a throttle positioning sensor or an exhaust nitrous oxide gas sensor, or a turbocharger pressure sensor in the case of non-naturally aspirated diesel engines. It will be appreciated that the system 1 can be "auto-tuned" on the basis of a single combustible gas injection rate made at a predetermined engine RPM value which may be idle.

Figure 3:
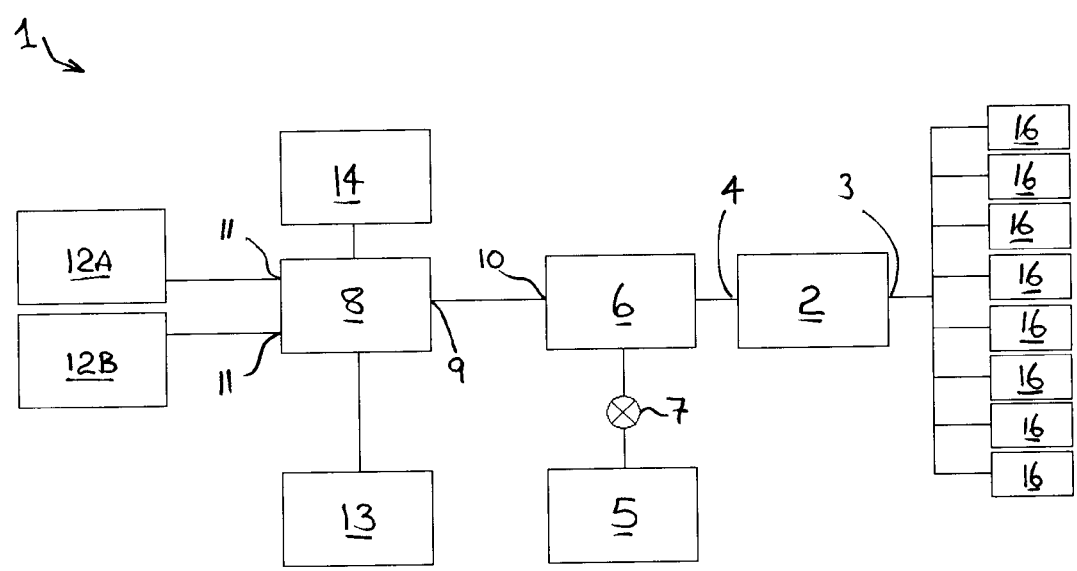
FIG. 3 is a is a block diagram of a system for injecting combustible gas in liquid form into the engine manifold or air in-take stream of a diesel fuel engine for combustion with diesel fuel therein according to another preferred embodiment of the invention.

Referring now to FIG. 3, there is shown another preferred embodiment of a system for injecting combustible gas in liquid form into diesel fuel engine for combustible diesel fuel therein. This embodiment of the system 1 is similar to that of FIG. 2 except that the injection device 2 supports a plurality of injectors 16 each configured to be disposed on or in a diesel engine cylinder so as to inject the combustible gas in liquid form directly into the cylinder prior to combustion. The system of FIG. 3 is shown as having eight injectors, one for each cylinder of an eight cylinder diesel engine.

The entry of the combustible gas into the cylinder in liquid form advantageously creates a pressure difference reducing the pressure in the cylinder thereby allowing more air to be present in the cylinder prior to combustion with the diesel fuel. Advantageously, the diesel fuel is not only efficiently burnt by the addition of the combustible gas at 0.35%, but additional air and hence fuel can be injected into the cylinder simultaneously with or after the combustible gas in liquid form due to the pressure reduction created thereby.

In this embodiment, the liquid combustible gas is most preferably injected directly into cylinders sequentially in an order corresponding to the cylinder firing. This advantageously allows the liquid combustible gas to be directly injected in a controlled manner and timed with the firing of each cylinder.

It will be appreciated that throughout the specification the injecting of combustible gas in liquid form is intended to mean that as the combustible gas is injected into the air intake stream/manifold, or directly into the cylinders, it is in a liquid form. This relatively quickly vaporises to advantageously reduce the pressure in the air intake stream/manifold or cylinder upon injection.

In this embodiment, the liquid combustible gas is most preferably injected directly into cylinders sequentially in an order corresponding to the cylinder firing. This advantageously allows the liquid combustible gas to be directly injected in a controlled manner and timed with the firing of each cylinder.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

What is claimed is:

1. A method of injecting a combustible gas in liquid form into a diesel fuel engine for combustion with diesel fuel therein, said method comprising:
   injecting said combustible gas in liquid form into said engine for combustion therein with said diesel fuel so as to maintain a combustible gas concentration in one or more cylinders of said engine prior to combustion,
   said combustible gas concentration being maintained in the range of 0.2% to 0.6% of air intake by volume of said combustible gas.

2. The method of claim 1, further comprising either measuring said concentration of said combustible gas injected into said engine or measuring an engine performance parameter; and
   varying the rate of injection of said combustible gas into said engine in response to said measured concentration of combustible gas or to said measured engine performance parameter.

3. The method of claim 1, wherein said injecting said combustible gas in liquid form into said engine further comprises either:
   injecting said combustible gas in liquid form into an air-intake stream or manifold of said engine upstream of one or more engine cylinders, or
   injecting said combustible gas in liquid form directly into one or more said cylinders.

4. The method of claim 3, wherein said combustible gas concentration in one or more cylinders of said engine prior to combustion is maintained between 0.25% to 0.55% of air-intake volume.

5. The method of claim 4, wherein said combustible gas concentration in one or more cylinders of said engine prior to combustion is maintained between 0.3% to 0.4% of air-intake volume.

6. The method of claim 2, wherein said measuring said concentration of combustible gas injected into said engine further comprises:
   bleeding a portion of said air-intake stream of said engine by combusting said combustible gas and said bled air-intake mixture; and
   measuring same with a time delayed hot wire sensor.

7. The method of claim 1, wherein said liquid combustible gas comprises one or more combustible gases selected from the group consisting of: liquid petroleum gas (LPG), natural gas, hydrogen, ethane, methane, propane, butane, hexane, heptane, pentane, acetylene, carbon monoxide, and ammonia.

8. The method of claim 1, wherein said injecting said liquid combustible gas comprises:
   measuring engine revolutions per minute of said engine ($REVS_{current}$) at engine idle ($REVS_{min}$) to determine a baseline injection rate; and injecting said liquid combustible gas ($GAS_{inject}$) at said baseline rate plus a predetermined rate proportional to said engine revolution rate ($REVS_{current}$).

9. The method of claim 8, further comprising:
measuring the air-pressure of said engine manifold at engine idle; and
varying said rate of injection of said combustible gas ($GAS_{inject}$) proportionally with said measured air pressure.

10. The method of claim 8, wherein said engine revolutions per minute of said engine is measured via the voltage output of an alternator of said diesel fuel engine or other engine signal source.

11. The method of claim 9, wherein said air-pressure of said engine manifold is measured via a corresponding measurement of a manifold absolute pressure (MAP) sensor, a turbo charger pressure sensor, a throttle positioning sensor, an exhaust temperature sensor, an exhaust nitrous-oxide gas sensor or a combination of two or more said sensors, or by attaching said engine to a dynamometer.

12. A system for injecting combustible gas in liquid form into a diesel fuel engine for combustion with diesel fuel therein, said system comprising:
a combustible gas injection device having an outlet disposed in fluid communication with said engine and an inlet disposed in fluid communication with a liquid combustible gas source;
a combustible gas injection device controller configured to receive input indicative of an engine performance parameter and configured to control the rate of injection of said combustible gas in liquid form from said combustible gas injection device outlet such that said combustible gas is present in one or more cylinders of said engine prior to combustion in the amount of between 0.2% to 0.6% of air intake by volume of said combustible gas.

13. The system of claim 12, wherein said engine performance parameter comprises:
a percentage of combustible gas mixed into said air-intake stream in said engine cylinders prior to combustion;
engine revolutions per minute of said engine;
a voltage output of the alternator of said diesel fuel engine or other engine signal source;
engine manifold absolute pressure; turbo charger pressure; throttle position; exhaust temperature;
exhaust nitrous-oxide gas concentration; and
an engine dynamometer.

14. The system of claim 12, wherein said combustible gas injection device outlet is configured either to inject said liquid combustible gas into an air-intake stream or manifold of said engine upstream of one or more engine cylinders, or to inject said combustible gas directly into one or more said cylinders.

15. The system of claim 12, wherein said liquid combustible gas comprises one or more combustible gases selected from the group consisting of: liquid petroleum gas (LPG), natural gas, hydrogen, ethane, methane, propane, butane, hexane, heptane, pentane, acetylene, carbon monoxide, and ammonia.

16. The system of claim 12 configured to perform the method for injecting combustible gas in liquid form into the diesel fuel engine of claim 1.

17. A diesel fuel engine modified to operate in accordance with the method of claim 1.

18. A diesel fuel engine comprising the system for injecting combustible gas in liquid form into the diesel fuel engine of claim 12.

* * * * *